United States Patent
Herz et al.

(10) Patent No.: US 9,735,638 B2
(45) Date of Patent: Aug. 15, 2017

(54) MAGNET CARRIER

(71) Applicant: Wittenstein AG, Igersheim (DE)

(72) Inventors: Christian Herz, Igersheim-Neuses (DE); Ingolf Gröning, Bad Mergentheim (DE); Kay-Horst Dempewolf, Würzburg (DE)

(73) Assignee: WITTENSTEIN SE, Igersheim (DE)

( * ) Notice: Subject to any disclaimer, the term of this patent is extended or adjusted under 35 U.S.C. 154(b) by 589 days.

(21) Appl. No.: 14/168,385

(22) Filed: Jan. 30, 2014

(65) Prior Publication Data
US 2014/0239748 A1    Aug. 28, 2014

(30) Foreign Application Priority Data

Feb. 27, 2013   (DE) .......................... 10 2013 101 957

(51) Int. Cl.
| | | |
|---|---|---|
| *H02K 21/12* | (2006.01) | |
| *H02K 1/28* | (2006.01) | |
| *H02K 15/02* | (2006.01) | |
| *H02K 1/27* | (2006.01) | |
| *H02K 1/30* | (2006.01) | |
| *H02K 7/04* | (2006.01) | |

(52) U.S. Cl.
CPC ............... *H02K 1/28* (2013.01); *H02K 1/278* (2013.01); *H02K 1/30* (2013.01); *H02K 7/04* (2013.01); *H02K 15/02* (2013.01); *Y10T 29/49012* (2015.01)

(58) Field of Classification Search
CPC ................................... H02K 1/27; H02K 1/28
USPC ...... 310/43, 156.01, 156.19, 156.29, 156.31, 310/156.61, 216.116, 216.121, 156.21
See application file for complete search history.

(56) References Cited

U.S. PATENT DOCUMENTS

| | | | |
|---|---|---|---|
| 2006/0061227 A1* | 3/2006 | Heideman ............ | H02K 1/2773 310/156.56 |
| 2008/0093945 A1* | 4/2008 | Gruenhagen .......... | H02K 1/278 310/156.19 |

FOREIGN PATENT DOCUMENTS

| | | |
|---|---|---|
| DE | 2756626 A1 | 12/1977 |
| JP | 04042743 A  * | 2/1992 |

* cited by examiner

Primary Examiner — Jose Gonzalez Quinones
(74) Attorney, Agent, or Firm — Moser Taboada

(57) ABSTRACT

A rotor, in particular a permanent magnet rotor, for an electrical machine, with a magnet carrier arranged concentrically with an axis of the rotor, wherein the magnet carrier has protrusions on its outer face, a number of magnets arranged on the outer face of the magnet carrier, which are arranged in the peripheral direction of the magnet carrier side-by-side and spaced apart from one another on the magnet carrier, wherein the magnets in each case are arranged between the protrusions, and plastic, which in each case is arranged between the magnets and at least partially encloses the protrusions.

13 Claims, 4 Drawing Sheets

MAGNET CARRIER

RELATED APPLICATIONS

This application claims priority to German Patent Application No. 102013101957.9, filed Feb. 27, 2013, which is herein incorporated by reference.

BACKGROUND

Technical Field

The invention relates to a rotor for an electrical machine and a manufacturing method for a rotor.

Description of the Related Art

From the prior art various permanent magnet rotors are of known art, wherein from the prior art a magnet carrier, on which magnets are arranged outboard is known. The magnets are, for example, held in their positions by means of plastic.

Thus EP 1 748 533 B1 discloses a permanent magnet rotor with a plastic cage, into which magnets can be inserted in the axial direction, However, plastic cages, or other parts cast in plastic for purposes of securing the positions of the magnets, have a small load capacity, so that rotational speeds are limited, or large cross-sections are required so as to withstand the loads. The axial insertion of the magnets has also proved to be impractical since it is labour-intensive in production terms.

SUMMARY

An object of the invention is to improve rotors of known prior art, or to specify improved manufacturing methods for rotors, in particular permanent magnet rotors. Here possible points for improvement are a lighter manufacturability, or a higher load capacity, wherein further improvements compared with the prior art can also be desired.

The object is solved with a rotor in accordance with Claim 1, a rotor in accordance with the independent device claim, and a manufacturing method in accordance with the independent method claim.

A first aspect of the invention is related to a rotor, in particular a permanent magnet rotor for an electrical machine, comprising a magnet carrier arranged concentrically with an axis of the rotor, wherein the magnet carrier has protrusions on its outer face, a number of magnets arranged on the outer face of the magnet carrier, which are arranged in the peripheral direction of the magnet carrier side-by-side and spaced apart from one another on the magnet carrier, wherein the magnets in each case are arranged between the protrusions and the rotor further comprising plastic, which in each case is arranged between the magnets and at least partially encloses the protrusions. The plastic typically forms filler elements between the magnets.

A second aspect of the invention is related to a rotor, in particular a permanent magnet rotor for an electrical machine, comprising a magnet carrier arranged concentrically with an axis of the rotor, wherein the magnet carrier has protrusions on its outer face, a number of magnets arranged on the outer face of the magnet carrier, which are fixed in the peripheral direction of the magnet carrier side-by-side and spaced apart from one another on the magnet carrier, and the rotor further comprising plastic, which in each case is arranged between the magnets, wherein the external or outer surface of the magnets is at least partially free of plastic.

A third aspect of the invention is related to a manufacturing method for a rotor for an electrical machine, in particular for a rotor in one of the typical embodiments described herein, with arranging a number of magnets side-by-side and spaced apart from one another on a magnet carrier, wherein the magnet carrier has undercut protrusions in regions between the magnets, and filling the regions between the magnets with a plastic such that the protrusions are enclosed by plastic.

In typical embodiments of rotors a magnet carrier is provided for the accommodation of magnets. The magnets are typically designed as permanent magnets. In other embodiments electromagnets can also be provided additionally or exclusively. The magnets are typically arranged or fixed on the magnet carrier side-by-side and spaced apart from one another in the peripheral direction of the magnet carrier. Typically the magnets have an elongated form, for example they have one edge length that is longer than the other two edge lengths. Here the longer edge length is usually oriented in the direction of the rotor axis. In other typical embodiments the magnets are provided with at least two equal edge lengths, or a longer edge length in the peripheral direction. Typically the magnets are oriented in the direction of the axis of the rotor. The herein so-called magnet carrier typically has a function of ensuring an optimal magnetic flux and at the same time of having a low weight. Instead of magnet carrier the term magnetic flux sheet can also be used in some embodiments. The optimal magnetic flux represents a magnetic flux with a solid shaft of conductive material. A holding function for the magnets is not necessarily assigned to the magnet carrier. Such a holding function can also be undertaken by other components of a rotor.

The magnets are typically arranged between respective protrusions of the magnet carrier. Typical protrusions comprise pins or square bolts or elongated protrusions extending in the longitudinal direction, i.e. in the axial direction, of the rotor. The elongated protrusions can be embodied in an interrupted or continuous form.

In typical embodiments the protrusions are undercut. Other embodiments comprise protrusions without undercut regions. In typical embodiments the protrusions are at least partially undercut. Typically an undercut is arranged on one face or on both faces of the protrusion. Typical protrusions have a dovetail shape. A dovetail shape offers the advantage of a simple structure and a reliable fixing. Typical protrusions are embodied in the longitudinal direction of the rotor as a rail with a dovetail shaped cross-section. In other examples of embodiments the protrusions are mushroom-shaped, rectangular, or pimple-shaped.

Typically the magnets have a width that is smaller than the separation distance between the protrusions arranged on the outer face of the magnet carrier. This enables an installation of the magnets in the radial direction between the protrusions. In this manner the installation is eased under some circumstances compared with an axial insertion of the magnets. In other embodiments, however, the separation distances between the protrusions can also be smaller so that the magnets are pushed in. In this manner a load capacity of the rotor can be improved.

The magnet carrier is typically embodied from a magnetically conducting material, in particular an electrical sheet or steel. Examples have the designations C45, M270-35A or NO20. Typical protrusions have a trapezoidal cross-section in the cross-section at right angles to the longitudinal axis of the rotor, wherein the trapezoidal cross-section can be undercut on one or two faces. Undercuts on two faces or two sides lead to a dovetail cross-section.

In typical embodiments the magnets have a tapering cross-section in the radial direction. This enables an improved introduction of the plastic material. In other embodiments the magnets have a cross-section in the radial direction that increases outwards, or a cross-section that remains constant. Typical magnets have a shape that is matched to the circular shape of the magnet carrier.

Typically the separation distance between two adjacent protrusions, i.e. between their widest point, is at least as wide as the width of one of the magnets; typically this separation distance is at least 0.5 mm or at least 1 mm larger than a magnet is wide. This eases an introduction of the magnets and a filling of the intermediate spaces with plastic. In particular in the interplay with undercut protrusions, such as for example a dovetail profile, a good form fit between magnet carrier, plastic and magnet ensues. In typical embodiments of the invention the connection between the magnet carrier via the plastic to the magnet is at least primarily loaded in compression, so that tension forces are minimised. Since plastic in general has a greater strength under compressive loading than under tensile loading, the load capacity of the connection is increased so that higher rotational speeds are enabled.

In typical embodiments the magnet carrier comprises depressions at the position of the magnets in which the magnets are accommodated. In this manner the magnets are securely fixed in their position in the peripheral direction. In other embodiments no additional depressions are provided for the magnets. This eases the manufacture of the magnet carrier.

In typical embodiments the external or outer surface of the magnets is at least partially free of plastic. Such an arrangement offers the advantage that the separation distance between the magnet of the rotor and a stator can be minimised and the magnetic flux can be improved.

In some embodiments a rotor core of plastic is arranged within the magnet carrier. The rotor core typically sits on a shaft. The rotor core typically has a radial thickness that is larger than the thickness of the magnet carrier. In other embodiments the rotor core is smaller. Such a rotor core offers the advantage that the weight of the rotor is reduced. The rotor core usually has a thickness in the radial direction of at least 10% of the radius of the rotor. Here the radius of the rotor typically corresponds to the separation distance between the axis of rotation of the rotor and an outer surface of at least one of the magnets arranged on the magnet carrier, or the outer surface of a plastic filler element that is arranged between the magnets. In examples of embodiment the thickness of the rotor core in the radial direction is at least 20%, at least 30%, or at least 40% of the radius of the rotor. Additional advantages can be achieved with a thickness in the radial direction of at least 45%, at least 50%, or at least 55%. In typical embodiments the rotor core is formed integrally with plastic arranged between the magnets. However, the rotor can also be formed separately from the plastic between the magnets. Here different plastics can also be used for the rotor and for the magnet fixing.

Typically rotors that are herein described are manufactured, in that a number of magnets are arranged side-by-side and spaced apart from one another on a magnet carrier, in particular are disposed in the radial direction or with a radially oriented direction of movement, and then regions between the magnets are filled with a plastic so that the protrusions are enclosed by the plastic or by filler elements that are formed with the plastic. The protrusions are typically undercut shapes, which are integrally formed with the magnet carrier and are typically arranged between the magnets.

Typically the plastic is injected or cast. Typical plastics can be thermoplastics or thermosetting plastics. Thermosetting plastics can be stiffer, tougher, or more resistant to chemicals. Thermoplastics can be more beneficial or simpler in manufacture. In addition fibres or other materials can be introduced into the plastics so as to improve the properties of the plastics. In embodiments with a rotor core the rotor core can be injected or cast together with the plastic between the magnets. Casting can take place with a gravity casting method; injection can take place with an injection casting method. Typical magnetic carriers are manufactured from solid material; in other magnetic carriers cut-outs are provided so as to save weight. This offers the advantage of an improved magnetic flux via the magnetic carrier. Other magnetic carriers are manufactured in multiple parts, for example from discs or rotor sheets. A rotor core of plastic offers weight advantages.

BRIEF DESCRIPTION OF THE FIGURES

In what follows embodiments are elucidated in more detail with the aid of the accompanying figures, wherein in the figures.

DESCRIPTION OF TYPICAL EXAMPLES OF EMBODIMENT

Figure 1:
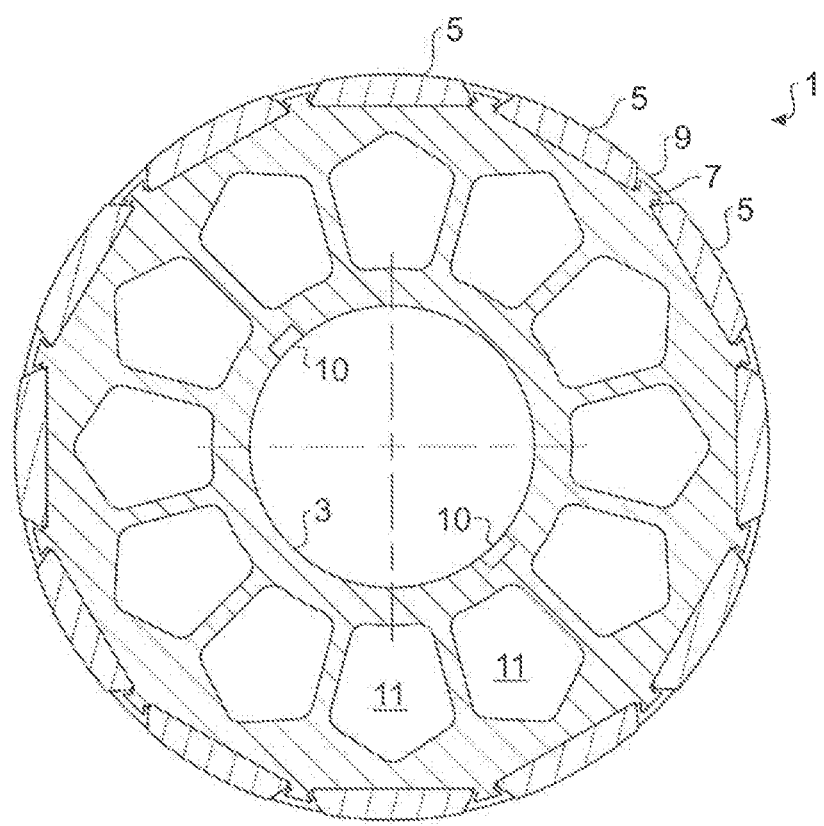
FIG. 1 shows an embodiment in a schematic sectional view.

In FIG. 1 is shown a typical embodiment of a rotor 1, which is embodied as a permanent magnet rotor. The rotor 1 comprises a magnet carrier 3, on which magnets 5 are arranged. The magnets 5 are arranged on the magnet carrier 3 between respective protrusions 7. The protrusions 7 are integrally designed with the magnet carrier 3, or are permanently connected with the latter in a form fit or a material bond, for example, are welded on, or bonded on with adhesive. Between the magnets 5 and the protrusions 7 plastic 9 is arranged in each case, which completely encloses the protrusions 7 and which abuts against both the protrusions 7 and against partial surfaces of the magnets 5 in a precise fit. The plastic thus forms filler elements between the magnets 5.

Figure 4:
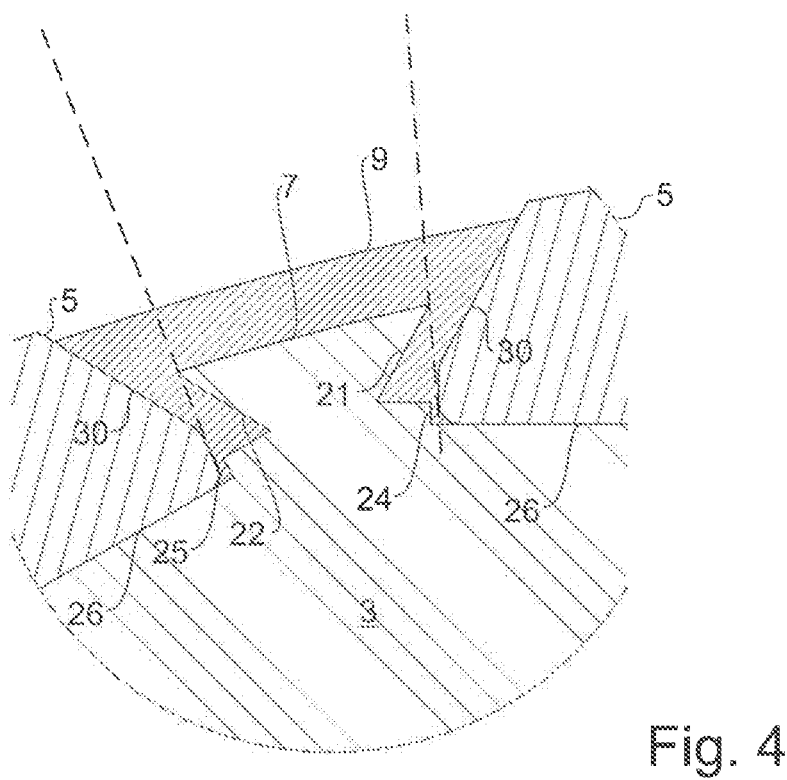
FIG. 4 shows a detail of the embodiment in FIG. 1.
Figure 5:
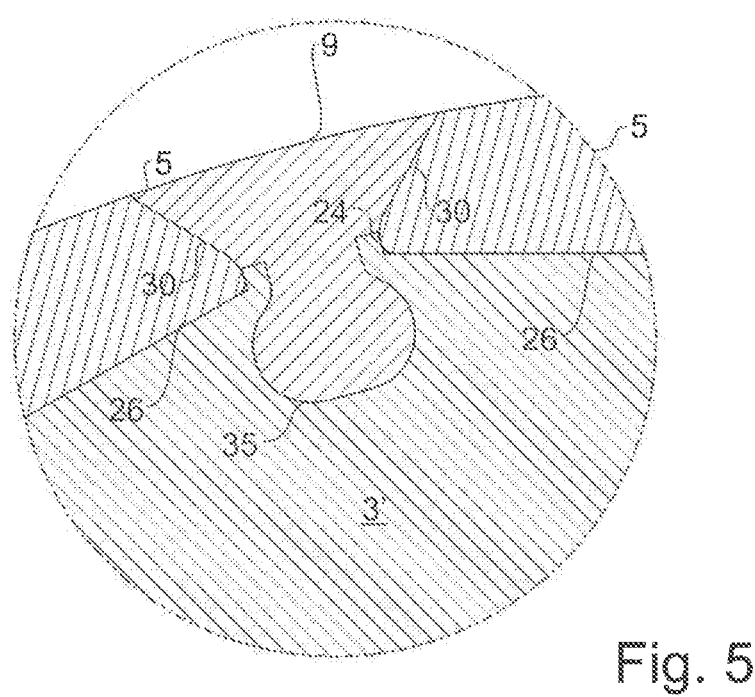
FIG. 5 shows a detail of another embodiment.

Details in conjunction with the protrusions 7, the filler elements of plastic 9 and the magnets 5 are shown in FIG. 4, wherein, moreover, an alternative possible configuration of this region is shown in FIG. 5.

The rotor 1 is designed as a permanent magnet rotor, wherein the magnets 5 are designed as permanent magnets. The rotor 1 is intended to be arranged on a shaft (not represented in FIG. 1), wherein the drive takes place by means of a magnetic field that is generated by a stator (not shown).

For a better connection to the shaft the magnet carrier 3 comprises grooves 10, into which ridges of a shaft can engage. Other embodiments of magnet carriers have a cylindrical inner surface without grooves. In the embodiment of FIG. 1 optional material cut-outs 11 are moreover provided so as to reduce the weight of the magnet carrier 3. As is the case for other reference symbols and features also, not all material cut-outs in FIG. 1 are provided with a reference symbol so as to improve clarity.

Material cut-outs in the magnet carrier are not present in all embodiments. In other embodiments at least a proportion of the material cut-outs of the magnet carrier are filled with a plastic, for example, the same plastic as the plastic of the filler elements. This enables a balancing procedure to be conducted in the event that only some of the material cut-outs of the magnet carrier are filled.

Manufacture of the embodiment of FIG. 1 is completed in that the magnets 5 are placed on the magnet carrier 3. The magnets 5 are placed in the radial direction from a radially outboard position in the prescribed regions between the protrusions 7. The plastic 9 is then injected in an injection casting method or cast in a casting method. In some embodiments the individual sections of the filler elements can also at least partially overlap the magnets 5 with the plastic 9. In typical examples of embodiment layers are preferred whose thickness is a maximum of 10% or a maximum of 5% of the thickness of the magnet. Furthermore the individual sections of the plastic 9 can be connected at the axial ends via a disk, a flange, or a ring, so that an injection casting method or a casting method is simplified and the magnets are additionally secured axially.

In the following description of the other figures reference is made to the description of the embodiment of FIG. 1, wherein for the same or similar parts the same reference symbols are used. In the figures the same parts are not all provided with a reference symbol so as to improve clarity. This applies, for example, to the magnets or the protrusions.

Figure 2:
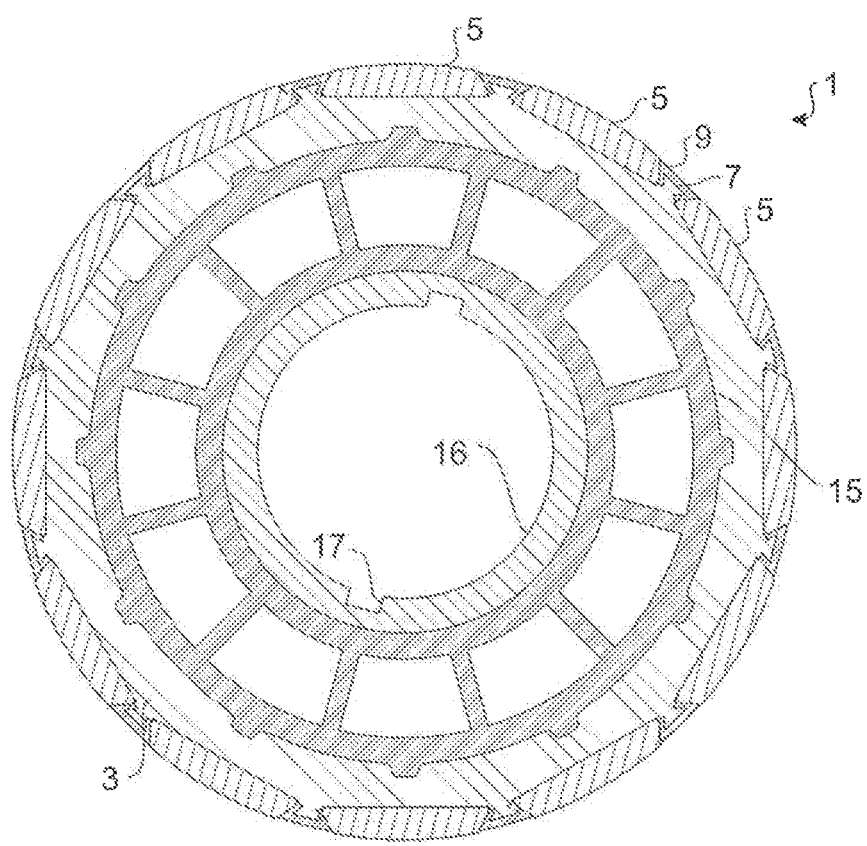
FIG. 2 shows another embodiment in a schematic sectional view.

FIG. 2 shows an embodiment with a rotor core 15, wherein for the other parts reference is made to the description of FIG. 1.

The rotor 1 of the embodiment of FIG. 2 comprises a rotor core 15, which is also manufactured out of plastic. The rotor core 15 sits on a hollow shaft 16 with grooves 17.

Figure 3:
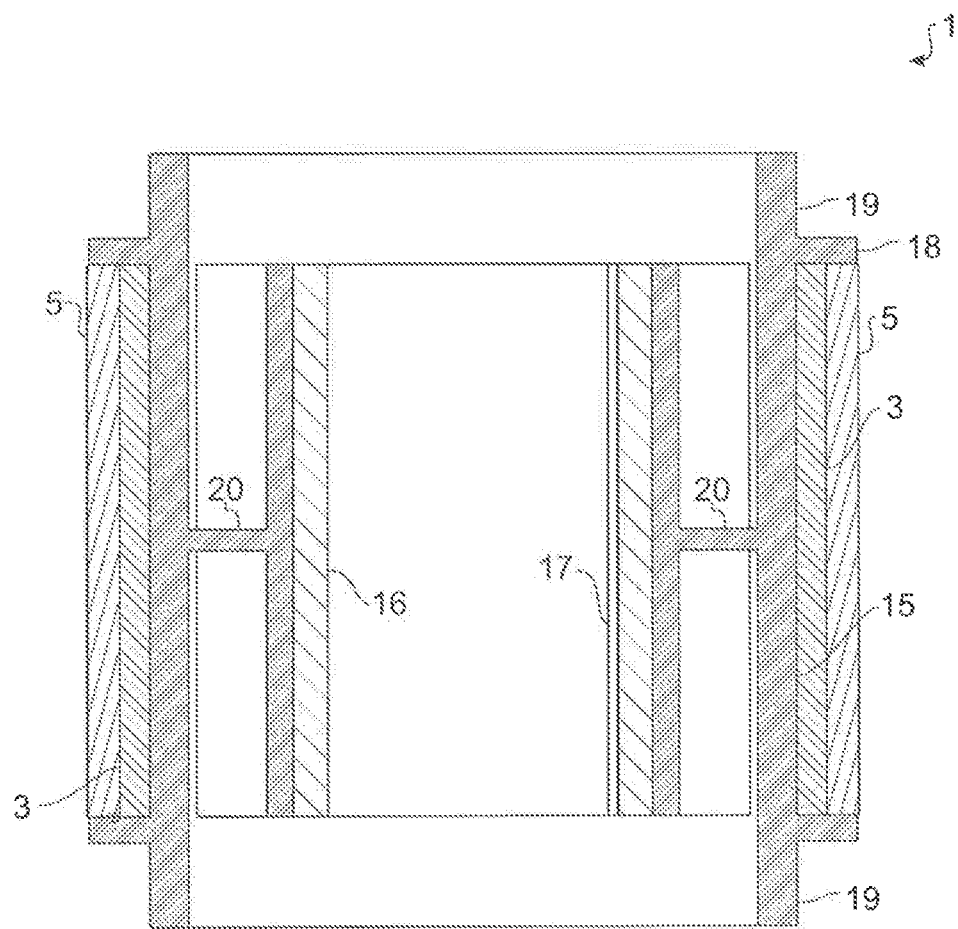
FIG. 3 shows the embodiment of FIG. 2 schematically in cross-section.

FIG. 3 shows the rotor core of FIG. 2 schematically in cross-section. The rotor core comprises flanges 18 at each of its axial ends, which flanges are embodied integrally with the rotor core 15. The plastic filler elements 9 (see FIG. 2) are connected with one another via the flanges 18. Furthermore axially projecting rings 19 are provided. For purposes of weight reduction the rotor core 15 moreover has cut-outs, by means of which a spoke structure is created for the rotor core (see also FIG. 2). For purposes of stabilising the rotor core struts 20 are provided.

Typically the same plastic is used for the rotor core as for the plastic filler elements between the magnets. Furthermore it is possible in some embodiments to provide a disk, a ring, or a flange on at least one of the axial ends of the rotor core, via which disk, ring, or flange the rotor core is connected with the filler elements between the magnets, so that the rotor core can be injected together with the filler element in a common injection process. A subsequent removal of such a ring is possible, furthermore it is possible in appropriate moulds to cast or inject both the filler elements and also the rotor core in one process, although they are spatially separate from one another. By the removal of regions of the ring or the flange a negative balancing procedure is also possible.

FIG. 4 shows the details of the embodiment of FIG. 1, in particular details of the attachment of the magnets. In FIG. 4 just one of the protrusions 7 is represented. In cross-section the protrusion 7 has a dovetail shape. There are two undercuts 21 and 22, which define the dovetail shape. Furthermore steps 24 and 25 are represented near the protrusion 7 on either side. In each case the steps 24 and 25 bound depressions 26 in which magnets 5 are accommodated. The steps 24 and 25 at the edge of the depressions 26 into which the magnets can be inserted, also stabilise the magnets, in particular during the manufacturing method, before the plastic is injected or cured.

The magnets 5 have partially curved bounding surfaces in cross-section. On the faces that in each case are oriented with the protrusions 7, inclined side faces 30 are provided. In magnets of typical embodiments the inclination of side faces that are oriented in the direction of the protrusions 7 corresponds at least essentially to the angle of the flanks of the protrusions. In this manner an at least essentially even separation distance between the magnets and the protrusions is achieved, so that a reliable filling with plastic is possible.

The magnets 5 have a width such that they can be inserted radially from outboard between the protrusions 7. The magnets 5 do not have to be inserted in the axial direction. The plastic 9 is cast or injected only after the insertion of the magnets 5.

In typical embodiments the side faces of the magnets are inclined such that the magnets taper radially outwards. Here the expression "side faces" usually indicates the surfaces whose surface normals are oriented in the peripheral direction and the radial direction, but not in the axial direction. In this manner the plastic between the magnets and the protrusions is essentially loaded in compression.

FIG. 5 shows a detail of another embodiment. With regard to the parts that are not shown in FIG. 5, or with regard to the description of parts that are shown in FIG. 5, but are not described in what follows, reference is made to the descriptions of the embodiments in the other figures. In general in the sectional drawings of this application the assumption is to be made that the sections shown remain constant over a finite length of the rotors in question. Thus both the indentations of embodiments and also protrusions of embodiments are typically unaltered or are in the form of rails in the axial direction. In other embodiments indentations or protrusions can also be interrupted.

The magnets 5 of the embodiment of FIG. 5 also have inclined side faces 30. The inclined side faces 30 enable a form fit with the plastic.

Typical embodiments have magnets with inclined side faces, wherein the inclination of the side faces relative to the radial direction is typically at least 10°, in other typical examples of embodiment at least 20° or at least 30°. The inclinations typically amount to a maximum of 70°, or a maximum of 60°, or maximum of 50° relative to the radial direction. In this manner the magnets are reliably held on the magnet carrier.

In the embodiment of FIG. 5, a magnet carrier 3 of another embodiment of a rotor has an undercut indentation 35, which is filled with plastic in an injection casting method or in a normal force casting method, herein also called a casting method.

With the filling of the indentation 35 and the intermediate space between the magnets 5 with the plastic 9 the magnets are fixed in their positions. For the embodiment of FIG. 5 corresponding features and advantages of the other embodiments apply in the case of identical or similar features. Thus in the embodiment of FIG. 5 steps 24 and 25 and also depressions 26 for the magnets are similarly provided so as to improve further the security of positioning of the magnets 5. Also the embodiment of FIG. 5 can be embodied with or without a plastic rotor core.

All embodiments can be manufactured with diverse manufacturing methods, for example the plastic can be cast or injected, wherein a simultaneous injection or casting of both a rotor core and also the filler elements between the magnets is possible.

The invention is not limited to the embodiments described. Other features of typical embodiments are specified in the claims.

The invention claimed is:

1. A rotor comprising:
   a magnet carrier arranged concentrically with an axis of the rotor, wherein the magnet carrier has protrusions on its outer face;
   a number of magnets arranged on the outer face of the magnet carrier, which magnets are arranged in the peripheral direction of the magnet carrier, side-by-side and spaced apart from one another on the magnet carrier, wherein the magnets are arranged in each case between the protrusions; and
   a plastic, which in each case is arranged between the magnets and which in each case at least partially encloses the protrusions,
   wherein the plastic is injected or cast, and
   wherein the maximum width of the magnets is smaller than the separation distance between the protrusions arranged on the outer face of the magnet carrier.

2. The rotor in accordance with claim 1, wherein the protrusions are at least partially undercut.

3. The rotor in accordance with claim 1, wherein the magnet carrier comprises a magnetically conducting material.

4. The rotor in accordance with claim 1, wherein the protrusions have a trapezoidal cross-section in a in cross-section at a right angle to the longitudinal axis of the rotor.

5. The rotor in accordance with claim 1, wherein the magnets are designed as permanent magnets.

6. The rotor in accordance with claim 1, wherein the magnets have a tapering cross-section in the outward radial direction.

7. The rotor in accordance with claim 1, wherein an outer facing external surface of each of the magnets is at least partially free of plastic.

8. The rotor in accordance with claim 1, wherein a rotor core of plastic is arranged within the magnet carrier.

9. A rotor comprising:
   a magnet carrier arranged concentrically with an axis of the rotor, wherein the magnet carrier has protrusions on its outer face;
   a number of magnets arranged on the magnet carrier, which magnets in the peripheral direction of the magnet carrier are fixed side-by-side and spaced apart from one another on the magnet carrier; and
   a plastic, which in each case is arranged between the magnets,
   wherein the plastic is infected or cast,
   wherein the maximum width of the magnets is smaller than the separation distance between the protrusions arranged on the outer face of the magnet carrier, and
   wherein an outer facing external surface of each of the magnets is at least partially free of plastic.

10. The rotor in accordance with claim 9, wherein a rotor core of plastic is arranged within the magnet carrier.

11. A manufacturing method for a rotor for an electrical machine, the method comprising:
    arranging a number of magnets side-by-side and spaced apart from one another on a magnet carrier, wherein the magnet carrier has undercut protrusions between the magnets; and
    filling regions between the magnets with a plastic, wherein the protrusions are enclosed by the plastic,
    wherein the plastic is infected or cast, and
    wherein the arranging comprises placing the magnets in a radial direction on the magnet carrier.

12. The manufacturing method for a rotor in accordance with claim 11, wherein a rotor core arranged between a shaft and the magnet carrier is produced from the same plastic.

13. The manufacturing method for a rotor in accordance with claim 11, wherein before the filling with the plastic the magnets are placed in the radial direction on the magnet carrier.

* * * * *